United States Patent
Hasselgruber et al.

(10) Patent No.: US 6,676,191 B2
(45) Date of Patent: Jan. 13, 2004

(54) HARDTOP VEHICLE ROOF MOVABLE BETWEEN CLOSED AND OPEN POSITION

(75) Inventors: Andreas Hasselgruber, Eberdingen-Nussdorf (DE); Alexander Bernhardt, Pforzheim (DE); Berthold Klein, Rutesheim (DE); Lothar Reiff, Margröningen (DE); Wojciech Wezyk, Sindelfingen (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/412,834

(22) Filed: Apr. 11, 2003

(65) Prior Publication Data

US 2003/0189356 A1 Oct. 9, 2003

Related U.S. Application Data

(63) Continuation-in-part of application No. 10/021,687, filed on Dec. 11, 2001, which is a continuation-in-part of application No. PCT/EP01/05860, filed on May 22, 2001.

(30) Foreign Application Priority Data

May 26, 2000 (DE) ......................................... 100 26 095

(51) Int. Cl.⁷ ................................................. B60J 7/04
(52) U.S. Cl. .......................... 296/107.17; 296/146.14; 296/107.07
(58) Field of Search .................. 296/107.17, 146.14, 296/107.07, 107.01, 108, 110, 116, 107.08

(56) References Cited

U.S. PATENT DOCUMENTS

| | | | | |
|---|---|---|---|---|
| 3,332,169 A | * | 7/1967 | Lore et al. ..................... 49/249 |
| 3,575,464 A | * | 4/1971 | Himka et al. ................. 296/117 |
| 4,852,935 A | * | 8/1989 | Varner .................... 296/146.14 |
| 5,078,447 A | * | 1/1992 | Klein et al. ............... 296/107.2 |
| 5,542,735 A | * | 8/1996 | Furst et al. ............. 296/107.18 |
| 5,558,388 A | * | 9/1996 | Furst et al. ............... 296/107.2 |
| 5,584,522 A | * | 12/1996 | Kerner et al. ............. 296/37.16 |
| 5,967,591 A | * | 10/1999 | Muehlhausen ......... 296/107.16 |
| 6,227,604 B1 | * | 5/2001 | Grace .................... 296/107.09 |

FOREIGN PATENT DOCUMENTS

| | | | |
|---|---|---|---|
| DE | 19639504 | * | 4/1998 |
| DE | 19706417 | * | 7/1998 |
| DE | 19737259 | * | 3/1999 |
| EP | 0678411 | * | 10/1995 |
| FR | 2693956 | * | 1/1994 |
| FR | 2696375 | * | 4/1994 |
| JP | 62-15120 | * | 1/1997 |

* cited by examiner

Primary Examiner—Joseph D. Pape
(74) Attorney, Agent, or Firm—Klaus J. Bach

(57) ABSTRACT

In a hardtop vehicle roof, which includes a front roof element and a rear roof element comprising side support members and a rear window panel, the front roof element is supported so as to be independently movable from the closed position to a storage position in a storage compartment disposed behind the vehicle roof so as to provide for the vehicle a Targa configuration, the rear window panel is independently movable into the storage compartment to provide for a Landau configuration and the front window is deposited in the storage compartment below the rear window panel while the side support members are retracted into side storage spaces to provide for a cabriolet configuration of the vehicle.

5 Claims, 4 Drawing Sheets

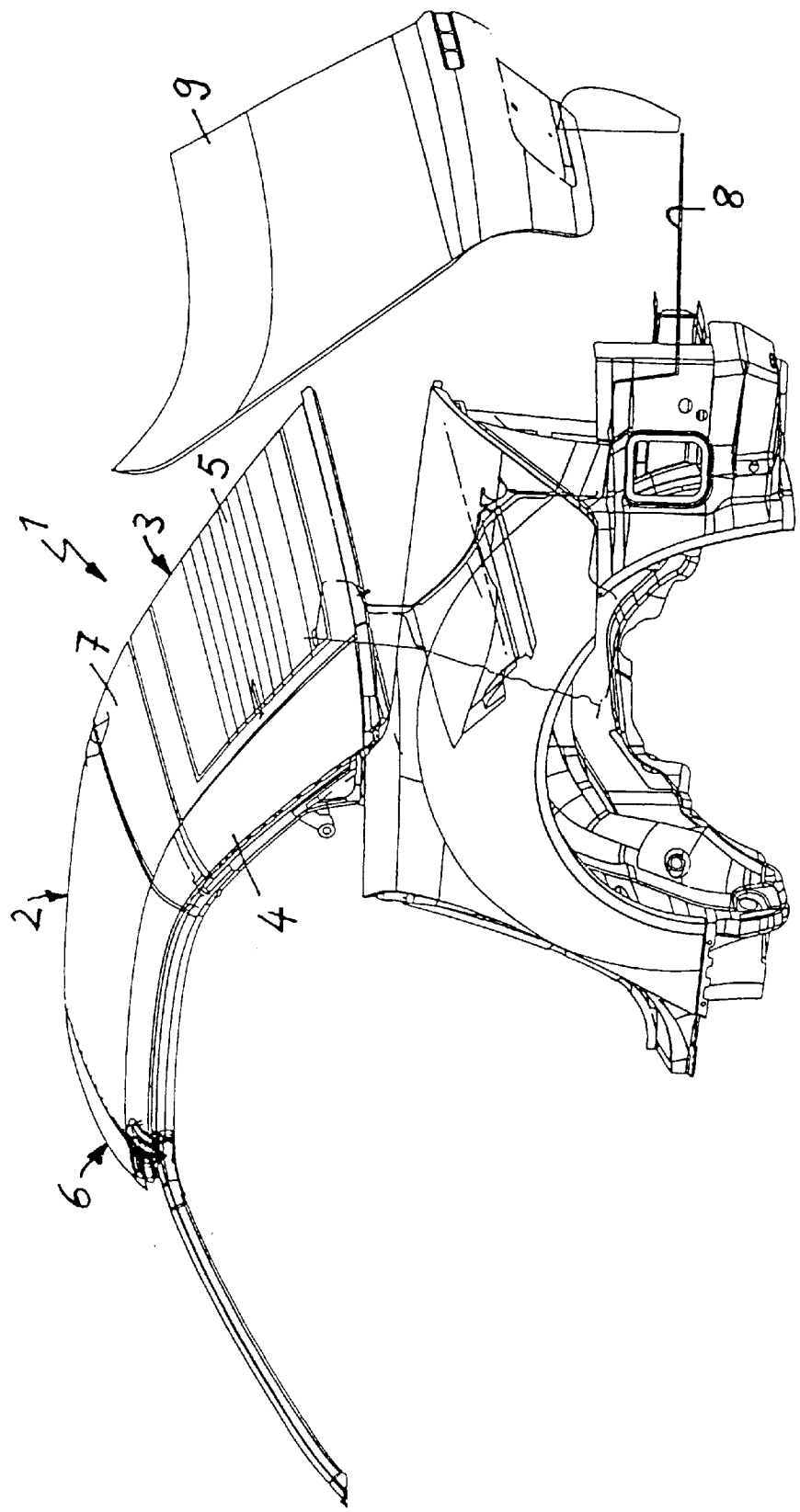

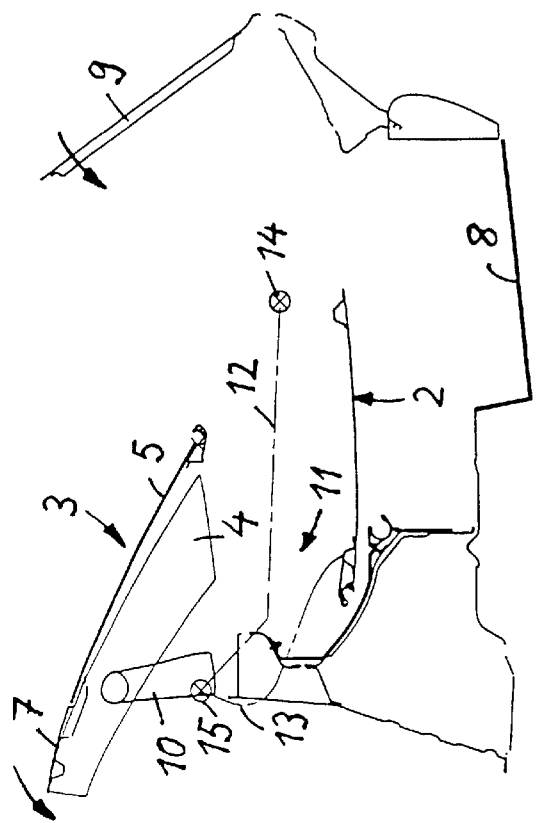
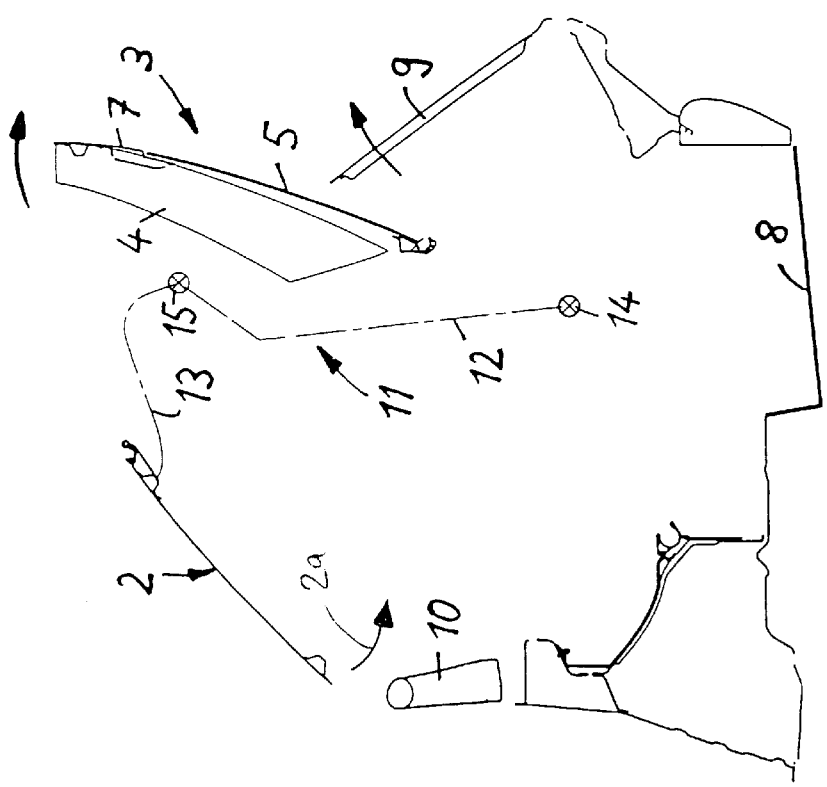

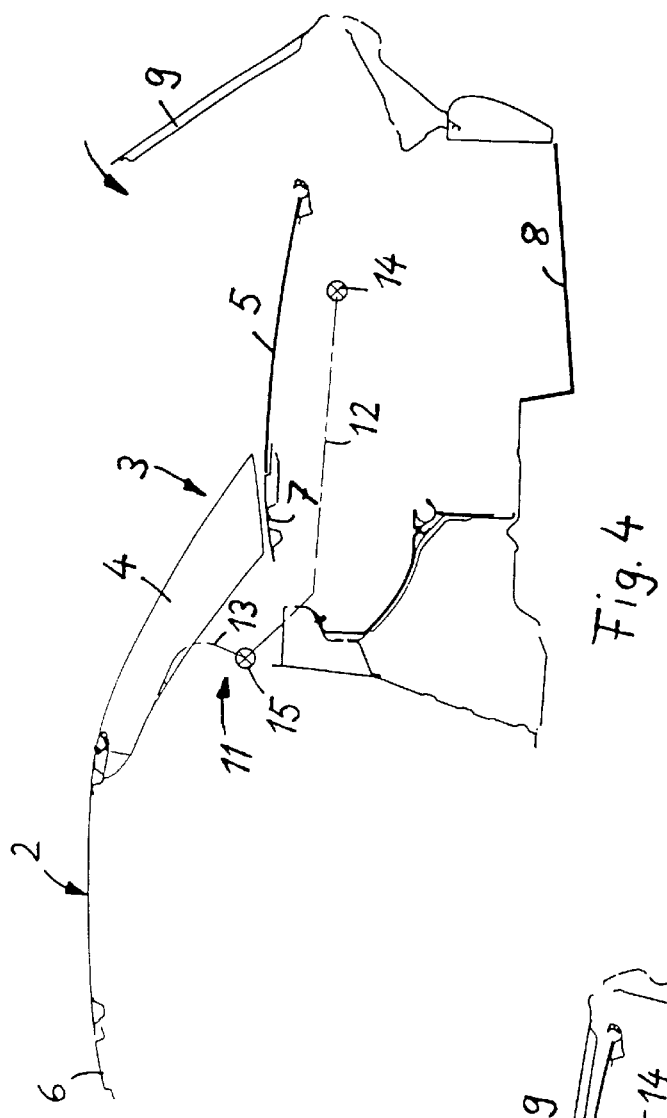
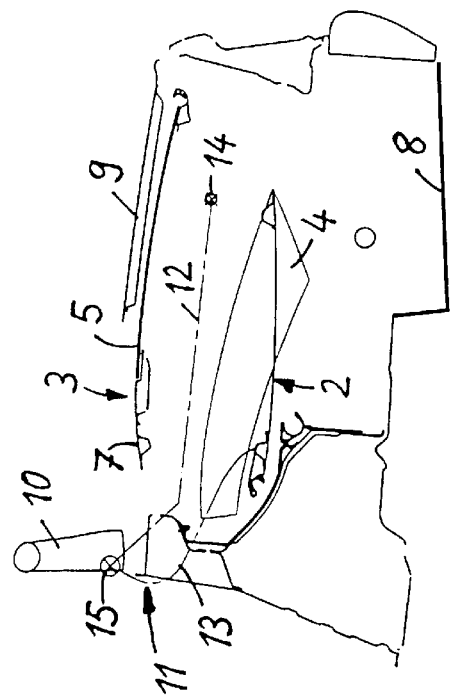
Fig. 4
Fig. 5

HARDTOP VEHICLE ROOF MOVABLE BETWEEN CLOSED AND OPEN POSITION

This a Continuation-In-Part application of U.S. Ser. 10/021,687 filed Dec. 11, 2001, which is a Continuation-In-Part application of international application PCT/EP01/05860 filed May 22, 2001 and claiming the priority of German application 100 26 095.1 filed May 26, 2001.

BACKGROUND OF THE INVENTION

The invention relates to a hardtop vehicle roof, which is movable between open and closed positions and which includes a front roof element and a rear roof element including side supports and a rear window, wherein, in the open position, both roof elements are contained in a storage space, and the rear window is a component which is movable independently of the side supports of the rear roof element.

Such a vehicle roof is known for example from German DE 196 39 504 A1. This publication shows a hardtop vehicle roof, which is movable between a closed position and two different open positions, a Targa position and a fully open position and which includes two movable roof elements which are disposed adjacent one another. The rear roof element carries a rear window. The two roof elements are independently pivotably supported on a lid, which covers the storage compartment for receiving the vehicle roof elements when the vehicle roof is in the open position.

In order to convert the hardtop vehicle roof to the Targa position, first the storage compartment lid is raised and the front roof segment is pivoted about its pivot axis to a position below the storage compartment lid. Then the storage compartment lid returns to its original position in which it covers the storage compartment. In a fully topless configuration of the vehicle also the rear roof element is pivoted about its pivot axis into a position below the storage compartment lid, that is, into the storage compartment.

DE 197 37 259 A1, which is considered to represent the state of the art, discloses a hardtop vehicle roof with front and rear roof elements. The front and rear roof elements are movable between a closed position and an open position. Iin the open position, that is the cabriolet position, both roof elements are disposed in a storage compartment behind the interior space of the vehicle. For the transition from the closed position to the open position, the rear window panel of the vehicle is removed from the side support members of the rear roof element and is placed into the storage compartment. Subsequently, the side support members are pivoted about a spatial axis outwardly so that the space between the two side support members is widened and additional space is provided for moving the front roof element into the storage compartment. The front roof element is then moved along a slide track guide structure between the outwardly pivoted side support members of the rear roof element into the storage compartment. Then the side support members are pivoted inwardly about a second pivot axis which extends essentially parallel to the longitudinal axis of the vehicle. In the open position of the vehicle roof, the side support members are disposed essentially in transverse direction of the vehicle.

This vehicle roof can only be moved between a closed and a fully open (cabriolet) position. A Targa position, in which only the front element of the vehicle roof is removed, and a Landau position, in which only the rear roof element is removed, is not provided for.

The side support members of the arrangement as disclosed in DE 197 37 259 A1 must each be pivoted about two different spatial axes in order to reach the open, that is the cabriolet, position. This requires a relatively complicated kinematic guide structure for the side support members.

Furthermore, when pivoted outwardly, the side support members extend beyond the contour of the vehicle body, whereby they may collide with objects disposed directly adjacent the vehicle.

The printed publication DE 197 06 417 C1 discloses a vehicle roof which can be converted to a Targa, a Landau and a cabriolet configuration. It has a soft top roof with a fabric-like top cover, which can be folded for placement in a storage compartment. The fabric top cover is supported by a kinematic support rod arrangement. The support arrangement comprises a plurality of frame members and support members, which are movable relative to one another and which can be folded together into a storage position.

On one hand, soft top roofs have the advantage that the fabric-like top cover can be folded together into a relatively small space and that also the space needed for the transfer movement between the closed and the open, that is, the storage positions is relatively small. On the other hand, hardtop roofs are substantially more durable and have better sealing capabilities and a longer life. In comparison with soft top roofs, they are also less likely to be distorted.

It is the object of the present invention to provide a hardtop vehicle roof which can be converted to a Targa, a Landau and also a cabriolet configuration and which requires a relatively small operating space during the opening and closing procedures and a relatively small storage space.

SUMMARY OF THE INVENTION

In a hardtop vehicle roof, which includes a front roof element and a rear roof element comprising side support members and a rear window panel, the front roof element is supported so as to be independently movable from the closed position to a storage position in a storage compartment disposed behind the vehicle roof so as to provide for the vehicle a Targa configuration, the rear window panel is independently movable into the storage compartment to provide for a Landau configuration and the front window is deposited in the storage compartment below the rear window panel while the side support members are retracted into side storage spaces to provide for a cabriolet configuration of the vehicle.

This arrangement permits a transfer of the vehicle roof to a Landau configuration in that the rear window panel is moved into the storage compartment and the side support members remain in the closing position. The front roof element remains in the Landau configuration in the original closed position above the passenger compartment. The front roof element is supported in the Landau configuration by the side support members of the rear roof element which also remain in their original position. In this way, the stability of the vehicle in that configuration is improved.

The vehicle roof consequently can have three different open configurations: A Targa configuration, a Landau configuration and a cabriolet configuration. The three configurations can be obtained independently of one another. Especially, the Landau configuration can be obtained with a minimum of control and movement input, since only the rear window panel must be removed from the side support members and placed into the storage compartment. The front roof element and all the other components of the rear roof element, particularly the side support elements remain in the closed position.

If a storage compartment lid is provided a direct kinematic coupling between the movement of storage compartment lid and the movement of a roof elements of the vehicle is not necessary. It is sufficient if the storage compartment lid is raised in a coordinated movement to provide for access to the storage compartment so that the respective elements of the vehicle roof can be transferred during the opening movement into the storage compartment. In case of a kinematically independent movement of the storage compartment lid and the vehicle roof elements, the storage compartment lid can be manufactured to a large degree free of design limitations.

During movement between the closed and open positions, the rear window panel performs preferably a mixed translatory/rotational movement, which is determined by movement control kinematics. The rotational movement component provides for a space-saving storage position of the window panel in the storage compartment, the translatory movement component provides for the movement of the rear window panel from its closed position at the rear end of the passenger compartment to the remote storage compartment.

However, it may also be suitable to provide exclusively for a translatory or exclusively for a rotational movement of the rear window panel to move it between the closed and the open positions.

It is advantageous if the front roof element is connected directly to the vehicle body by way of a link arrangement which includes specifically two joint-guided links, which permit pivoting of the front roof element during transfer from the closed to the storage position by an angle of about 180° so that the front roof element is disposed in the storage compartment upside down with the inside of the front roof element being directed upwardly toward the storage compartment opening. Such an arrangement provides for a particularly compact storage volume in the storage compartment. Preferably, the first link of the link arrangement is pivotally connected to the vehicle body and the second link is pivotally connected to the first link and is also pivotally connected to the roof element so that, by way of the three joints of the link arrangement, the front roof element has three degrees of freedom of movement which permit a mixed rotational/translatory movement of the roof element. A direct kinematic coupling between the operating kinematics of the front roof element and the operating kinematics of the rear roof element is not absolutely necessary but it may be provided.

When the front roof element is opened, that is, moved into the storage compartment, the vehicle roof is in a Targa configuration.

In a cabriolet configuration, the front roof element is disposed in the storage compartment below the rear window panel preferably in such a position that the inside of the rear window panel is disposed adjacent the front roof element. In cabriolet configuration also the side support members are contained in suitable storage compartments, especially in storage compartments provided between the B columns and the wheel wells of the vehicle. The side support elements are subjected for that purpose preferably to a mixed translatory/rotational displacement movement and are disposed such that, in a cabriolet configuration position, their outsides are disposed on top. In this way only a relatively small rotational pivot movement is necessary during the transfer into the cabriolet configuration. This simplifies the operating kinematics.

An embodiment of the invention will be described below in greater detail on the basis of the accompanying drawings.

BRIEF DESCRIPTION OF THE DRAWINGS

FIG. 1 is a perspective view of a hardtop vehicle roof in a closed position,

FIG. 2 shows the vehicle roof schematically in an intermediate position during conversion to a Targa configuration wherein the front roof element is moved into the storage compartment, FIG. 3 shows the vehicle roof in Targa configuration, FIG. 4 shows the vehicle roof in Landau configuration, FIG. 5 shows the vehicle roof fully disposed in the storage compartment for a cabriolet configuration of the vehicle.

DESCRIPTION OF AN EMBODIMENT OF THE INVENTION

Figure 6:
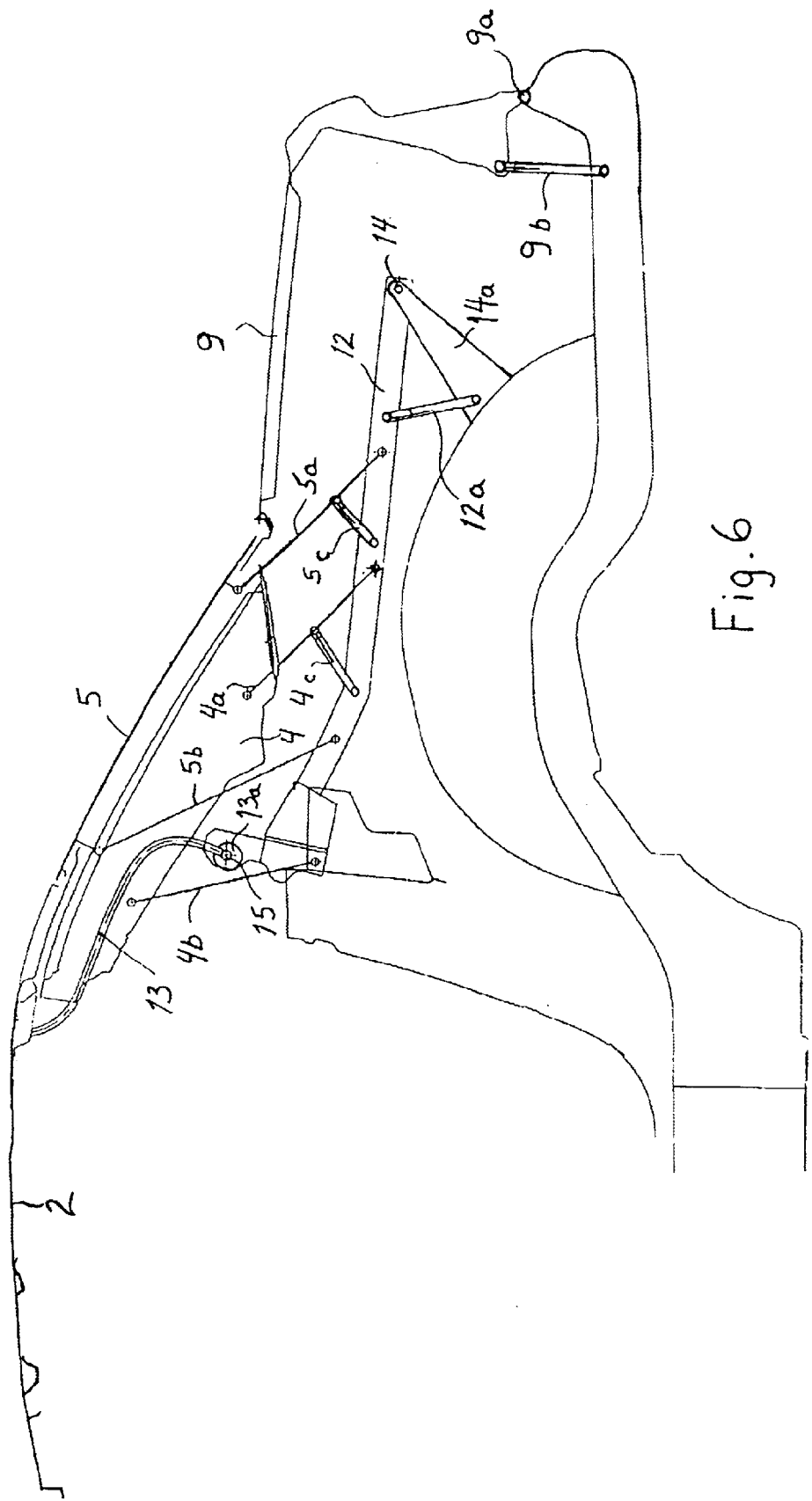
FIG. 6 shows schematically the rear end of the vehicle with the vehicle roof closed.

In the figures identical components are designated by the same reference numerals.

As shown in FIG. 1, the vehicle roof 1 is in the form of a hardtop. It comprises a front roof element 2 and a rear roof element 3. The rear roof element includes a side support members 4 and a rear window panel 5 with a frame 7 enclosing the rear window panel 5 at least partially. The front and the rear roof elements 2, 3, are rigid components. In FIG. 1, the vehicle roof is shown in a closed position in which the front roof element 2 adjoins a windshield frame 6 of the vehicle. The rear window panel 5 is movable independently of the side support members 4 of the rear roof element 3, wherein the rear window panel 5 including the frame 7 can be released from a connection with the side support members 4. Preferably, there is no direct coupling between the kinematic operating mechanism, which provides for the movement of the side support members and the displacement of the rear window panel 5 between the closed position as shown in FIG. 1 and the open position. There is preferably also no direct coupling between the kinematic operating mechanism for the front roof element 2 and the kinematic operating mechanism for the rear roof element 3. The front roof element 2, the side support members 4 and the rear window panel 5 are movable essentially independently of each other.

Behind the vehicle interior, that is, the passenger compartment of the vehicle, which, in the closed position of the vehicle roof, is covered by the vehicle roof 1, a storage compartment 8 is provided which is to be covered by a storage compartment lid 9. The storage compartment lid 9 can be pivoted open around a rear pivot axis, which is remote from the passenger compartment, for providing access to the storage compartment and permitting deposition of the components of the vehicle roof in the storage compartment when the vehicle roof is open.

In the intermediate position as shown in FIG. 2, that is, a roof position between the closed position and a Targa configuration, first the rear roof element 3 is pivoted open about a transverse axis extending transverse to the longitudinal axis of the vehicle, in order to provide for sufficient space for the opening movement of the front roof element 2. At the same time, the storage compartment lid 9 is opened in order to make the storage compartment 8 accessible. During the opening movement of the rear roof element 3, the rear roof element 3 is pivoted, together with the side support members 4, the rear window panel 5 and the frame 7 of the rear window panel 5. When the rear roof element 3 is pivoted into the vertical position as shown in FIG. 2, the front roof element 2 is pivoted by the linkage arrangement 11 out of its closed position into the open position. The front roof element 2 is directly mounted on the vehicle body by the linkage arrangement 11. The linkage arrangement 11 consists of two arms 12 and 13 of which the first link 12 is pivotally mounted to the vehicle body by a pivot joint 14 and the second link 13 is pivotally connected to the first link 12 by another pivot joint 15. By a controlled movement of the link arrangement 11, the front roof element 2 is movable during the transition from the closed to the open position, with respect to a vehicle-based coordinate system, in a translatory as well as a pivoted fashion. The at least two degrees of freedom of movement of the linkage arrangement 11 facilitate the movement of the front roof element 2 along a path of movement which does not interfere with other vehicle components particularly over the headrests 10.

In the Targa configuration as shown in FIG. 3, the rear roof element is again in the closed position into which it is returned from the upright position as shown in FIG. 2. The front roof element 2 is pivoted with respect to the closed position by about 180° and also moved backwardly and downwardly into its storage position in the storage compartment 8. In this position, the inside of the front roof element 2 is on top. After transfer of the front roof element 2 into the storage compartment 8, the storage compartment lid 9 is again closed.

FIG. 4 shows the vehicle roof in a Landau configuration, in which the front roof element 2 is in its closed position adjoining the windshield frame 6. In this position also the side support members 4 of the rear roof element 3 are in the closed position in which the front roof element 2 is supported. At the same time, the rear window panel 5 including its frame 7 has been moved to the open position and is disposed in the upper part of the storage compartment 8. The storage compartment lid 9 is shown in an open position. It can be pivoted in the direction of the arrow for closing the storage compartment 8 and covering the rear window panel 5. The rear window panel 5 is disposed in the storage compartment 8 with its outside disposed on top.

FIG. 5 shows the vehicle roof in a cabriolet configuration of the vehicle wherein the front roof element 2 and the rear roof element 3 including the side support members 4 and the rear window panel 5 are deposited in the storage compartment 8. The inside of the rear window panel 5 and the inside of the front roof element 2 face each other in the storage position, wherein the rear window panel is disposed above the front roof element 2, that is, it is disposed close to the opening of the storage compartment.

FIG. 6 shows schematically the rear end of the vehicle with the vehicle roof closed. The operating mechanisms for the roof 2, the support members 4, the rear window panel 5 and the trunk lid 9 are also shown.

The trunk lid 9 is supported at the rear end of the vehicle so as to be pivotable about a pivot joint 9a. It can be opened and closed by a hydraulic lid operator 9b.

The operating mechanisms for all the other components are supported on a main support arm 12, which is pivotally mounted at 14 on a support member 14a. The main support arm 12 is pivotable by an operating cylinder 12a.

The rear window panel 5 is supported on the main support arm 12 by operating links 5a and 5b and is operable by a hydraulic cylinder 5c. The side support member 4 is supported on the main support arm 12 by side support links 4a and 4b and is operable by a hydraulic cylinder 4c. The roof 2 is pivotally supported on the main support arm 12 by a support arm 13, which is mounted by a pivot joint 15 and rotatable by a pivot motor 13a.

The various components are independently operable in order to provide for various vehicle configurations: the closed position in which the vehicle top covers the vehicle interior as shown in FIG. 6, the Targa configuration, in which the roof element 2 is removed but the rear roof element including the side support members and the rear window panel remain in place, the Landau configuration, in which the rear roof element is removed and of course the convertible configuration, in which both the front and rear roof parts are removed.

In order to obtain any of those positions—starting with the closed position as shown in FIG. 6—the trunk lid 9 is first opened by actuating the hydraulic (or pneumatic) cylinder 9b. The rear trunk lid 9 is pivoted thereby to the open position as shown in FIGS. 1, 3 and 4. In order to achieve the Targa configuration, the main support arm 12 is then pivoted upwardly about the pivot point 14 by actuating the operating cylinder 12a. When the roof has been raised to an essentially upright position, or before the roof reaches the upright position, the pivot motor 13a is activated to pivot the support arm 13 and, together therewith, the roof section 2 inwardly in the direction of the arrow 2a (FIG. 2). Upon pivoting the main arm 12 back, the roof section 2 is then disposed upside down in the trunk as shown in FIGS. 3 and 5.

In order to obtain the Landau position, with the trunk lid 9 open, the operating cylinder 5c is activated to pivot the links 5a and 5b together with the rear window panel 5 backwardly into the trunk, whereupon the trunk lid 9 is again closed.

For a fully open position, the cabriolet configuration, the trunk lid 9 is again first opened, the main support arm 12 is raised, and the front roof section 2 is pivoted inwardly. As for obtaining the Targa position, the rear window panel 5 is pivoted backwardly. As for obtaining the Landau configuration, the side support member 4 is also pivoted back into the trunk by actuating the operating cylinder 4c. When the main support arm 12 is then again lowered, the various component are all disposed in the trunk as shown in FIG. 5.

What is claimed is:

1. A hardtop vehicle roof movable between closed and open positions and comprising a front roof element and a rear roof element including side support members and a rear window panel wherein, for conversion to a cabriolet configuration, both roof elements are movable into a storage compartment and said rear window panel of said rear roof element is movable independently of the side support members, said front roof element being movable independently of the rear roof element to permit moving of only the front roof element into the storage compartment so as to provide for a Targa configuration of said vehicle, said rear window panel being movable, independently of said rear roof element, into said storage compartment while the front roof element and the side support members remain in a closed position so as to provide for a Landau configuration of said vehicle said rear roof element being pivotable upwardly about an axis extending transverse to the vehicle longitudinal axis for providing space for the opening and transfer movement of the front roof element into the storage compartment during conversion of the vehicle roof from the closed position to the Targa configuration, said front roof element being adapted to be pivoted during transfer from the closed position to the storage position by 180° so as to be deposited in the storage compartment at the bottom with the inside of the front roof element facing upwardly and said rear window panel being disposed in a cabriolet configuration of said vehicle in said storage compartment above said front element.

2. A hardtop vehicle roof according to claim 1, wherein said rear window panel is supported such that, during movement of the rear window panel between the closed and the storage positions thereof, the rear window panel is subjected to translatory and pivot movement.

3. A hardtop vehicle roof according to claim 1, wherein said front roof element is supported directly on the vehicle body by means of an operating linkage.

4. A hardtop vehicle roof according to claim 3, wherein said operating linkage includes at each side of said vehicle two links, which are pivotally joined to each other.

5. A hardtop vehicle roof according to claim 1, wherein said side support members are subjected during movement between the closed and the open positions to a translatory and a pivotal displacement and are deposited in the storage compartment in the cabriolet configuration of the vehicle with their outer sides facing upwardly.

* * * * *